United States Patent
Pope et al.

(10) Patent No.: US 10,498,867 B2
(45) Date of Patent: Dec. 3, 2019

(54) NETWORK INTERFACE DEVICE AND HOST PROCESSING DEVICE FIELD

(71) Applicant: SOLARFLARE COMMUNICATIONS, INC., Irvine, CA (US)

(72) Inventors: Steven L. Pope, Cambridge (GB); David J. Riddoch, Cambridgeshire (GB); Derek Roberts, Cambridge (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 240 days.

(21) Appl. No.: 15/341,967

(22) Filed: Nov. 2, 2016

(65) Prior Publication Data

US 2018/0124216 A1    May 3, 2018

(51) Int. Cl.
| | |
|---|---|
| H04L 29/06 | (2006.01) |
| H04L 12/935 | (2013.01) |
| H04L 29/08 | (2006.01) |
| G06F 13/10 | (2006.01) |

(52) U.S. Cl.
CPC ........... *H04L 69/163* (2013.01); *H04L 49/30* (2013.01); *H04L 67/10* (2013.01); *H04L 69/16* (2013.01); *G06F 13/102* (2013.01)

(58) Field of Classification Search
CPC .............................. H04L 69/163; H04L 67/10
See application file for complete search history.

(56) References Cited

U.S. PATENT DOCUMENTS

| | | | |
|---|---|---|---|
| 6,631,434 B1 * | 10/2003 | Johnson | G06F 13/24 710/260 |
| 7,835,380 B1 | 11/2010 | Aloni et al. | |
| 2005/0138242 A1 * | 6/2005 | Pope | G06F 9/544 710/48 |
| 2011/0179183 A1 | 7/2011 | Lindsay | |

(Continued)

FOREIGN PATENT DOCUMENTS

EP    2574000 A2    3/2013

OTHER PUBLICATIONS

EP 17199526.9-1213—Extended European Search Report dated Feb. 13, 2018, 11 pages.

(Continued)

*Primary Examiner* — Brian J. Gillis
*Assistant Examiner* — Chhian (Amy) Ling
(74) *Attorney, Agent, or Firm* — Haynes Beffel & Wolfeld LLP (57) ABSTRACT

A network interface device includes an interface configured to receive data packets for a host processing device and an engine supporting a network interface device component of an application that is provided on the host processing device. In response to receiving data packets for the application, the engine is configured to cause at least some of the data packets to be available to the component of the application, to cause the data packets to be delivered to a protocol stack of the host processing device, and to receive control information associated the data packets from the protocol stack of the host processing device. The interface is configured to output an acknowledgement message comprising the control information.

21 Claims, 3 Drawing Sheets

(56) References Cited

U.S. PATENT DOCUMENTS

2013/0080651 A1* 3/2013 Pope ................... H04L 69/161
                                                    709/231
2013/0117465 A1* 5/2013 Pope .................. G06F 9/45533
                                                    709/232
2014/0310405 A1   10/2014 Pope et al.

OTHER PUBLICATIONS

EP 17199526.9—European Examination Report dated Feb. 19, 2019, 8 pages.
EP 171 99526.9—Office Action dated Jul. 9, 2019, 8 pages.

* cited by examiner

| Source Port 300 | Destination Port 302 |
|---|---|
| Sequence Number 304 ||
| Acknowledgment Number 306 ||
| Data offset (4-bits) 314 | Reserved 316 | Control 312 | Window 308 |
| Check-sum 310 ||| Urgent pointer 318 |
| Options 320 ||| Padding 322 |
| Data... 324 ||||

Figure 3

NETWORK INTERFACE DEVICE AND HOST PROCESSING DEVICE FIELD

FIELD

Some embodiments relate to a network interface device, to a host processing device and respective methods.

BACKGROUND

Data processing systems may comprise a host computing device and a network interface device. The network interface device is configured to provide an interface to a network to allow the host computing device to be able to receive data from other host computing devices via the network.

The data which is received may be in the form of data packets. Protocol processing needs to be performed on the data packets in order for the host computing device to be able to consume the data in the data packets.

One example of a streaming or transport layer protocol is TCP. With the TCP protocol, data is transmitted by encapsulating it in TCP segments that may be dropped, retransmitted and reordered. As a result a stream of data may not arrive at the receiver in the correct sequence. Thus, TCP streams require that the protocol stack managing the streams can handle out of order packets to generate a reliable byte stream for upper layer protocols and applications.

The data packet in addition to being transport protocol processed may also be need to be upper layer protocol processed. The transport layer TCP protocol may be processed prior to any upper layer protocols—for example, TCP data packets are correctly reassembled into an ordered stream so as to allow the payload data of those data packets to be re-formed and the upper layer messages extracted for processing by an upper layer protocol stack.

SUMMARY

According to an aspect, there is provide a network interface device comprising: an interface configured to receive data packets for a host processing device; and an engine supporting a network interface device component of an application, said application being provided on said host processing device, said engine configured in response to receiving of one or more data packets for said application, to cause at least some of said one or more data packets to be available to said component of said application, to cause said received one or more data packets to be delivered to a protocol stack of said host processing device, and to receive from said protocol stack of the host processing device control information associated said with said one or more data packets, wherein said interface is configured to output an acknowledgement message comprising said control information.

The protocol stack of the host may be configured to perform transport stream protocol processing and said control information comprises transport stream protocol information.

The transport stream protocol may be TCP.

The control information may comprise TCP window size information.

The engine may be configured in response to receiving of one or more data packets for the host processing device to generate said acknowledgement message, said acknowledgement message comprising an acknowledgment associated with said one or more data packets and said control information.

The engine may be configured to determine based on said control information received from said protocol stack if a further acknowledgement message associated with said one or more data packets is to be output by said interface.

The engine may be configured to determine if there is a discrepancy between the control information in the acknowledgement message output by the interface and the control information received from the protocol stack for said one or more data packets to determine if a further acknowledgement message is to be output.

The engine may be configured to use said control information received from said protocol stack in a subsequent acknowledgement message.

The engine may be configured to receive said control information from said protocol stack in an acknowledgement message.

The engine may be configured to receive said control information from said protocol stack in a host acknowledgement message and when said engine determines that a further acknowledgement is required, said host acknowledgement message is output as said further acknowledgement message.

The engine may be configured to receive said control information from said protocol stack in an acknowledgement message which message is, in use, output by said interface as said acknowledgement message comprising said control information.

The engine may be configured to provide to said host processing device information to indicate that payload of one or more of said data packets has been provided to said component of said application.

The information indicating that payload of one or more of said data packets has been provided to said component of said application may be provided with the one or more data packets delivered to said protocol stack.

The information indicating that payload of one or more of said data packets has been provided to said component of said application may be provided by setting a bit to a given value.

The engine may comprise an FPGA, an embedded CPU or logic and state machines.

The engine may be configured such that at least some of said one or more packets is caused to be available to said component of said application in response to one or more conditions being satisfied.

The one or more conditions may comprise one or more of a protocol state and a payload content of said one or more data packets.

The application may comprise a financial trading application.

The application may comprise an in line compression application

The application may comprise an in line decryption and firewall application.

The engine may be configured to deliver said at least some of said one or more data packets to a memory location to which said component of said application has access and to provide an indication to said application component that said data is available for processing.

The component of said application may be configured to indicate to said engine when said application component has processed said at least some of said one or more data packets.

The application component may be configured to receive information from said API on the host processing device for said application to control one or more of when and which data is processed by the application component.

Alternatively that the application component may perform the data processing transparently.

According to another aspect, there is provided a method performed in a network interface device, said method comprising: receiving one or more data packets for a host processing device; causing at least some of said one or more data packets to be available to a component, on said network interface device, of an application, said application being provided on said host processing device; causing said received one or more data packets to be delivered to a protocol stack of said host processing device; receiving from said protocol stack of the host processing device control information associated said with said one or more data packets; and outputting an acknowledgement message comprising said control information.

The protocol stack of the host may be configured to perform transport stream protocol processing and said control information comprises transport stream protocol information.

The transport stream protocol may be TCP

The control information may comprise TCP window size information.

The method may comprise generating said acknowledgement message, said acknowledgement message comprising an acknowledgment associated with said one or more data packets and said control information.

The method may comprise determining based on said control information received from said protocol stack if a further acknowledgement message associated with said one or more data packets is to be output by said interface.

The method may comprise determining if there is a discrepancy between the control information in the acknowledgement message output by the interface and the control information received from the protocol stack for said one or more data packets to determine if a further acknowledgement message is to be output.

The method may comprise using said control information received from said protocol stack in a subsequent acknowledgement message.

The method may comprise receiving said control information from said protocol stack in an acknowledgement message.

The method may comprise receiving said control information from said protocol stack in a host acknowledgement message and when a further acknowledgement is required, said method comprises outputting said host acknowledgement message as said further acknowledgement message.

The method may comprise receiving said control information from said protocol stack in an acknowledgement message and outputting said message as said acknowledgement message comprising said control information.

The method may comprise providing to said host processing device information to indicate that payload of one or more of said data packets has been provided to said component of said application.

The method may comprises providing information indicating that payload of one or more of said data packets has been provided to said component of said application with the one or more data packets delivered to said protocol stack.

The method may comprise providing the information indicating that payload of one or more of said data packets has been provided to said component of said application by setting a bit to a given value.

The method may comprising making the at least some of said one or more packets available to said component of said application in response to one or more conditions being satisfied.

The one or more conditions may comprise one or more of a protocol state and a payload content of said one or more data packets.

The application may comprises a financial trading application,

The method may comprise delivering said at least some of said one or more data packets to a memory location to which said component of said application has access and providing an indication to said application component that said data is available for processing.

The method may comprise indicating, by the component of said application, when said application component has processed said at least some of said one or more data packets.

According to another aspect, there is provided a host processing device comprising: an application, said application having a component on a network interface device, whereby data from data packets for said application are consumed by the application on the host processing device or the application component on the network interface device, and a protocol stack configured to receive from the network interface said data packets including data packets consumed by said application component on the network interface device, protocol process said packets to determine control information associated with the data packets, and provide said control information to said network interface device, The protocol stack may be configured to perform transport stream protocol processing and said control information comprises transport stream protocol information.

The transport stream protocol may be TCP

The control information may comprise TCP window size information.

The control information may be provided by the protocol stack in an acknowledgement message.

The host processing device may be configured to receive information from the network interface device to indicate that payload of one or more of said data packets has been provided to said component of said application. The host processing device may discard some or all of the payload which has been provided to the component of the application.

The information indicating that payload of one or more of said data packets has been provided to said component of said application may be provided with the one or more data packets received by said protocol stack.

The information indicating that payload of one or more of said data packets has been provided to said component of said application may be provided by setting a bit to a given value.

The application may comprises a financial trading application,

The host processing device may comprise an API which provides an interface between the application on the host processing device and the component on the network interface device. The application on said host processing device may be configured to control one or more of when and which data is processed by the application component on the network interface device.

BRIEF DESCRIPTION OF THE DRAWINGS

Some embodiments will now be described by way of example with reference to the accompanying drawings.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the scope of the present invention. Thus, the present invention is not intended to be limited to the embodiments shown, but is to be accorded the widest scope consistent with the principles and features disclosed herein.

When data is to be transferred between two host processing devices over a data channel provided by a network, each of the host processing devices has a suitable network interface device to allow it to communicate across the channel. The host processing devices and their network interface devices use a protocol to form the data that is transmitted over the channel, so that it can be decoded by a respective receiving host processing device. The data channel may be considered to form part of a network, and additional devices may be connected to the network.

Data may be received at a network interface device. The network interface device may be capable of supporting the physical and logic requirements of the network protocol, for example Ethernet.

The communication of an application of a host processing device over a network may be facilitated through the use of sockets. A socket may form an end-point for a communication over a network. The management of the sockets, for example determining whether a socket is ready to be processed by an application, may be carried out by the application making system calls to the operating system of the device. The system call may indicate a file descriptor associated with a socket.

System calls to determine whether one or more sockets are ready for processing may return an indication of the sockets that can be processed.

Figure 1:
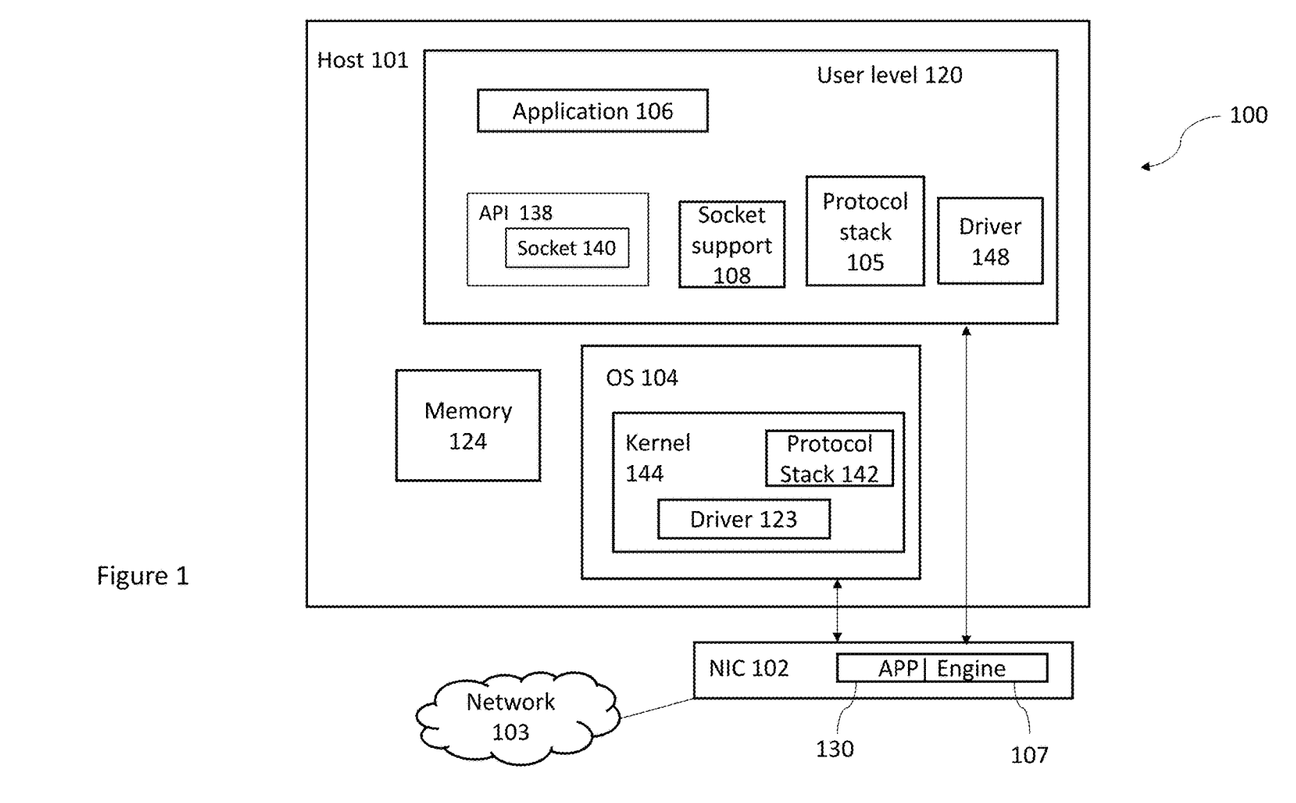
FIG. 1 is a schematic diagram of a data processing system of an embodiment.

Reference is made to FIG. 1 which shows a host computing device 101 and network interface device 102 that together comprise a data processing system 100.

A host computing device may be any suitable computing device. By way of example, the host computing device may comprise one or more of a server, a personal computer, a switch, a router, a bridge, a virtualised system (e.g. a virtualised operating system and the applications it supports), a portable device such as a tablet computer or smartphone or any other suitable computing device. In some embodiments the host device may be provided by a set of two or more computing devices. These computing devices may be the same or different. These computing devices may be any one or more of the previous examples of computing devices.

The network interface device may be any hardware device configured to interface a wired or wireless network to a host computing device. The network interface device could be provided in any manner between a network and host device. The network interface device may be an integral part of the host processing device. The physical hardware components of the network interfaces are sometimes referred to network interface cards (NICs) although they need not be in the form of cards. For example, they could be in the form of integrated circuits (ICs) and connectors fitted directly onto a motherboard. The network interface device may be provided by a LAN (local area network) or LOM (LAN on motherboard). The network interface device may alternatively or additionally be provided as one or more peripheral devices such as a PCIe card of the host computing device. In the following, reference will be made to a NIC. It should be appreciated that in other embodiments, any other suitable network interface device may be used.

The NIC 102 has an interface 150 which allow the NIC to cause packets to be transmitted onto the network and to receive packets from the network 103. The NIC 102 has at least one processor 107 or other processing capability. The at least one processor may provide an engine functionality. In some embodiments the at least one processor may comprise one or more FPGA (field programmable gate array, an embedded CPU or logic and state machines.

In the arrangement of FIG. 1 the data processing system 100 comprises the host computing device 101 coupled to the NIC 102 that is arranged to interface the host to a network 103.

The host computing device includes an operating system 104 supporting one or more applications 106. The applications are provided at user level 120. An application programming interface (API) 138 supporting at least one socket 140 associated with the application 106 is provided.

A network protocol stack 105 is provided. The network protocol stack may be provided at the operating system and operate in the kernel context, or it could be a user level protocol stack. In some embodiments, there may be a protocol processing stack both at the user level and the operating system. In the example shown in FIG. 1, the network protocol stack referenced 105 is provided at the user level 120 and the protocol stack referenced 142 is provided in the kernel 144 of the operating system 104.

The user level may comprise a network driver functionality 148 for allowing access to the NIC 102 which bypasses the OS 104. This may be in the receive and/or transmit direction.

The operating system may be a conventional monolithic operating system, a privileged domain (e.g. a hypervisor) supporting one or more virtualised operating systems, or a virtualised operating system itself. There could therefore be multiple software environments (represented by the entities OS 104, protocol stack 105 and application 106) at the host computing device.

The operating system comprises the kernel 144. The kernel may 144 comprise a device driver 123 for the NIC.

The data processing system has memory 124. In some embodiments at least some part of the memory may be allocated to the application. In particular at least a part of the memory may provide one or more buffer locations for application data for a respective application.

The user level may further include a socket support function 108. This socket support function may comprise a file descriptor table indicating a correspondence between a file descriptor and a resource (for example a socket) identified by the file descriptor. This socket support function may also comprise an event notification mechanism which monitors events and informs the application when sockets associated with that application are ready to be processed. The event notification mechanism may for example comprise one or more event queues on which notifications corresponding to the placing of data on one or more socket queues may be placed. Some embodiments may make use of buffers, pointers and file descriptors in order to provide data received at the NIC 102 to the relevant application 106.

In operation, an application such as application 106 wishing to receive network packets over the network may create a port to which network packets may be addressed. Packets addressed to the port number of the port and IP address of the host will be processed by the protocol stack 105 after being received at the NIC. The port may be bound to a socket which acts as a communication end-point. The socket may be provided with a socket queue which is a queue like data structure into which data for the socket may be placed in order that it may be accessed by an application, process or thread for which the socket is created.

In the following example, the NIC supports the Ethernet protocol which is a link layer protocol. It should be appreciated that in other embodiments, alternatively or additionally one or more other link layer protocols may be supported.

The packets which are received will have a format defined by the appropriate protocols. For example the packets may be in accordance with TCP, the network layer internet protocol (IP) and link layer Ethernet (IEEE 802.3) and thus have a nested set of protocol headers as follows:

[Ethernet[IP[TCP<payload data>]]]

where transport layer TCP is carried within an IP packet which is carried within an Ethernet packet. The link (e.g. Ethernet) and network layer (e.g. IP) protocol processing may be performed at the NIC and/or the host processing device. There may also be additional protocol layers above the transport layer—for example, middleware messaging or quality of service protocol layers—and these would preferably be handled at the host processing device. It should appreciated that the protocols discussed previously are by way of example only and any other suitable protocol may alternatively be used.

Some embodiments may use a transport stream protocol such as TCP and its payload data represents upper layer protocol messages. Each TCP data packet (or other transport stream packet) includes an identifier of the stream (e.g. IP address and port number) and a sequence number that identifies the position of the packet in the stream sequence. However, different embodiments may use a transport stream protocol other than TCP.

In some embodiments a connected socket is created on the host processing device. Thus all the TCP state will be in the host processing device including the transmission control block, in some embodiments.

The application code which is causing the connection to occur is on the host processing device. However in embodiments, a component 130 of the application is provided in the NIC. For example, the component of the application may be provided by the engine 107. As discussed previously the TCP stack is provided on the host processing device. This stack may include all state machines which manipulate the TCB.

The API can be considered to provide an API between the application components, that is the application supported at the user level and the application part supported by the NIC.

Figure 2:
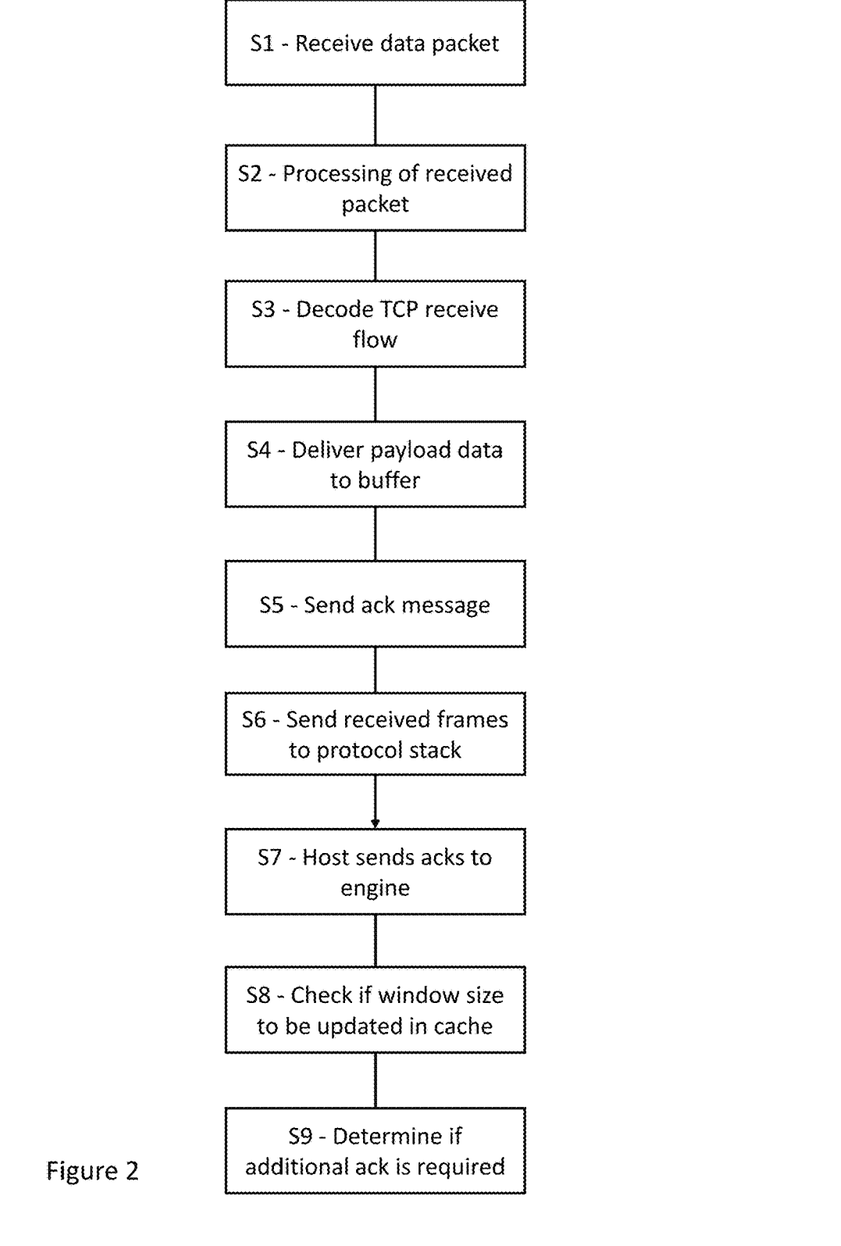
FIG. 2 shows an example of a method of an embodiment.

Reference is made to FIG. 2 which shows a method of some embodiments. The method may be performed by the system shown in FIG. 1 or any other suitable system.

In step S1, the NIC 107 receives a data packet from the network.

In step S2, the engine 107 is configured to process the received packet.

In step S3, the engine will decode the TCP receive flow information. In some embodiments, this may be carried out during the processing of the received packet in step S2.

Checksums maybe validated—optionally the payload is delivered before checksum validation is completed.

In step S4, the engine 107 delivers payload data to the application component 130. More particularly, the payload data is delivered to a correct position into a respective buffer to which the application component 130 has access. This may be a location in the memory 124 of the host processing device or local memory provided on the NIC. The correct position of the respective application buffer is dependent on the TCP sequence number which is decoded by the engine 107. The engine 107 is configured to have access to the respective buffer for the application component so can write the payload data into that buffer. This may be performed by a DMA (direct memory access) operation. It should be appreciated that this step is optional. In some embodiments, this step may not be provided at all. In other embodiments, this step may be performed in dependence one or more of the TCP protocol state and the content of the packet. For example, the step S4 may be performed if the TCP protocol state is connected. The step may be performed in dependence on payload signatures.

It should be appreciated that in some embodiments the API enables the host application component to signal to the NIC application component whether to start processing the received frames, for example entirely or according to an application signature. An example of application signature is a particular application header such as an http request.

Thus, the payload data is delivered in order to the NIC accessible memory for application processing by the application component on the NIC, The engine will provide information to the NIC application as to how much data has arrived for processing The NIC application component may be configured to provide an indication to the engine to inform the engine when the NIC application component has finished processing the data in the NIC accessible memory. This is to avoid the NIC overrunning the NIC accessible memory location.

In step S5, the engine is configured to send acknowledgement messages either directly or this may be performed by the application component 130. The acknowledgement messages will reflect the data which has been received and/or the latest TCP window size or sizes from the host. The API may indicate to the application component whether it should generate ACKs.

In some embodiments, step S5 and S4 may take place in any order or at the same time.

In step S6, the engine sends the received frames to the host processing device. In particular the received frames are sent to the host such that the protocol processing stack 105 at the user level is able to protocol process the frames. The protocol processing stack is able to update the TCB (transmission control block) with the new state such as sequence numbers and window sizes for the connection. It should be appreciated that the engine may provide an indication to the host processing device to indicate that the payload has already been consumed by the application component on the NIC. This information will indicate to the host processing system that the payload does not need to be delivered to the socket and can be discarded. This information may be provided in any suitable format and may be provided by a bit which has one value if the payload has already been received and a different value if the payload has not yet been received. The values may be 1 and 0.

It should be appreciated that the API may provide information to the host protocol stack as to whether to discard the payloads received or deliver them to the socket.

The API may allow a host stack which is aware of the offload provided by the NIC application component to receive information or be otherwise notified that the host stack will only be receiving a subset of the received data. That subset of received data may be, for example, just the headers of the received data. In this case the host stack should act as though all the payloads have been delivered, and for the received data determine whether or not to deliver it to the host application component.

It may be that all the application processing, or a subset of the application processing, takes place on the NIC application component. The host stack may be aware or unaware of this.

It should be appreciated that step S6 may take place before, after or at the same time as step S5.

In step S7, the engine receives from the host processing system ACKs for the data. In particular, the ACKs are provided by the protocol processing stack at user level. The ACKs which are provided by the host processing system are configured for output onto the network. The ACKs are generated as though the host stacks have consumed the entire byte stream including any bytes consumed by the application component in the NIC. The engine intercepts the ACKs which include the ACK of the data received and the TCP window size.

In steps S8 and S9, the engine will check the ACKs to track state and decide if an additional ACK needs to be generated. For example, the engine will check if there is a discrepancy between the window size which it has stored in cached memory and the window size in the message.

If there is a discrepancy, the engine will update its cache. The engine may also send the ACK which it received from the host processing device. This may for example be dependent on the extent of the discrepancy. If there is more than a threshold amount of a discrepancy then the ACK will be sent. In some embodiments, even if there is a discrepancy no ACK is sent and instead for example the updated window size is sent in the next TCP message.

If there is no discrepancy, the engine may discard the ACK.

The TCP receive window size defines the number of data bytes which can be sent before the transmitter requires an acknowledgement and a window update from the receiving host.

In one modification, the engine will not provide an ACK. In this case step S5 may be omitted and the engine will cause the ACK from the host processing device to be transmitted. The engine may however update its cached TCP state as a result of observing the ACK from the host. If the NIC application component is congested or if for any reason the ACK could allow data to be transmitted which would overflow the available buffering at the NIC then the engine may delay the ACK from the host and/or raise an exception through the API to indicate that the system is at risk of overflow.

It should be appreciated that one or more of the above steps may be combined. Additionally or alternatively one or more of the above steps may be omitted. Additionally or alternatively, one or more of the above steps may be provided in a different order.

Some information which is held in the headers of a data packet may be readily read from each data packet using simple logic. The stream identification information (e.g. IP address and port number) may be used by the NIC to identify which data packets are to have their payload data delivered to the application component.

The engine may maintain a cached TCB which includes the sequence number.

The sequence numbers are used to determine where in NIC local memory payloads should be delivered. The application component should also be aware of the region of this memory which contains valid in order data—this can be expressed using the sequence numbers or some other suitable indexing means.

The NIC may generate ACKs only for data which has been correctly received (in order) and leave more the complex acknowledgement protocols of TCP (such as selective acknowledgement) or to request retransmission to the host stack. Optionally more complex RFCs can be implemented on the NIC.

In some embodiments the NIC application component may transmit. This is described in more detail later. The transmissions will comprise a TCP packet with the ACK information including the window size from the receive side processing. A TCP transmission will contain ACK information from the reception side Reference is made to FIG. 3 which shows the format used by TCP messages. This format may be used in embodiments which use TCP. This message format is used for the received TCP packets as well as for the acknowledgement messages. The TCP header has the following fields:

Source port field 300

Destination port field 302

Figure 3:
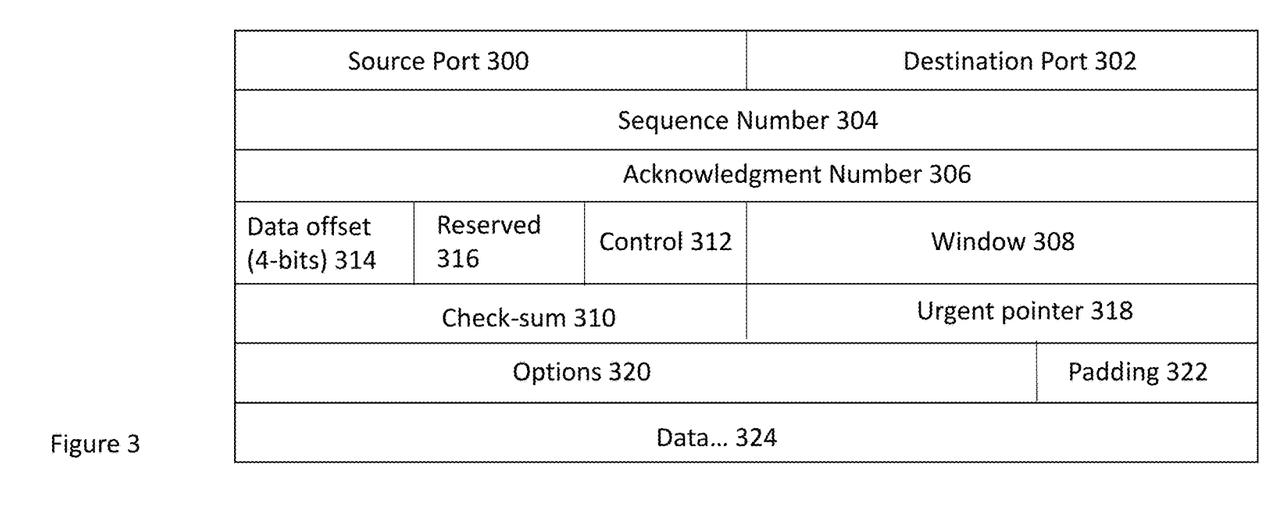
FIG. 3 shows a TCP packet structure.

Sequence number field 304—this is used to order the data if the packets are received out of order and to ensure that all the packets are received.

Acknowledgement number field 306—this field is used when an acknowledgement field flag bit is set in the control field and when set the field will indicate the sequence number of the TCP segment which is expected next.

Data offset field 314

Reserved field 316

Control field 321

Window field 308—this is as discussed previously.

Checksum field 310

Urgent pointer field 318

Options field 320

Padding field 322

Data field 324—this contains the actual payload data.

The network protocol stack is shown in FIG. 1 as a single homogeneous unit but could in fact be a collection of multiple processing entities located at the operating system (e.g. running in the kernel context), and/or at user level (e.g. at a user level transport library). The network protocol stack could additionally be capable of handling data flows in accordance with any number of other connected-oriented or connectionless protocols.

The host computing device may transmit data over network 103 by means of the network protocol stack by passing messages to the stack for transmission in accordance with the transport stream protocol. Typically those messages will be configured in accordance with an upper layer protocol such as HTTP (e.g. in the case of data from a web server running at the host) or IMAP (e.g. in the case of data from an email server running at the host).

The engine 107 may receive data from the application (either or both of the application components on the NIC and the host) and process the received data in accordance with the upper layer protocol.

The NIC 102 is configured to transmit the upper layer messages from the applications. When an upper layer message is to be transmitted, the network protocol stack 105 performs TCP and lower layer transmit processing so as to generate the information required to form the TCP and lower layer headers of the data packet for carrying the upper layer message. This information is passed to the network interface device (preferably the engine) so as to enable the data packet to be generated for carrying an upper layer message. Typically the necessary TCP information would include one or more of: TCP receive window size, ACK number, segment sequence number, source and destination port numbers, maximum segment size, and any options set for the particular TCP stream. Analogous parameters exist for other transport stream protocols. The information necessary to form lower layer protocol headers might include (for a TCP/IP/Ethernet data packet) Ethernet MAC address, VLAN-ids, IP addresses and IP IDs. The host stack could provide the information by passing a template data packet to the NIC that includes the necessary headers and into which the upper layer message payload can be inserted.

The engine may be configured to request in advance the information required from the host stack 105 to form one or more TCP data packets for carrying the messages so that the NIC can form each TCP data packet as soon as the engine generates each upper layer message. Once an upper layer message is ready for transmission, the network interface device forms the transport layer protocol headers in dependence on the information received from the host stack 105.

One application of some embodiments will now be described. Host device 101 supports a trading application 106 (with components on the host and on the NIC) which is configured to interact with a remote electronic exchange accessible to the host over one or more TCP streams established over network 103 by means of network protocol stack 105 and network interface device 102.

Once a trading strategy has been selected by means of application 106, the host stack configures the engine of the NIC to place trades at the electronic exchange over the one or more TCP streams under the control of a set of trading algorithms configured to effect the selected trading strategy. The trading algorithms could be supported in software at the host (e.g. at the trading application) or by the application component at the NIC. The application component may be supported by the engine and/or by software. The trades are transmitted to the exchange as messages processed by the engine in accordance with the FIX (financial information exchange) upper layer protocol and sent over one of the TCP streams.

The engine may be an FPGA that supports both FIX protocol processing and the trading algorithms configured to affect the selected trading strategy. The trading decisions taken by algorithms at the engine could be informed by financial data received over the network (e.g. by FIX-Fast over UDP) and processed at dedicated hardware of the NIC (this could be at the engine) or another peripheral device of the system.

Responses from the exchange to the trades placed by the engine are received as FIX messages over TCP. Thus, messages from the exchange are consumed at the application component on the NIC and/or by the application component on the host as discussed previously. The host stack performs TCP protocol processing and handles any exception cases. The decoded FIX messages may be released to either or both of the application components.

Another use case is where the device is acting as a man in the middle performing operations such as compression, decrypt/encrypt and firewalling. This means that at a TCP flow which ordinarily would be made from A-B is instead terminated at C, resulting in two independent TCP flows (A-C and C-B).

At point C applications such as compression/decompression or encryption/decryption, firewalling or logging could be instantiated.

The application may comprise an in line compression application.

The application may comprise an in line decryption and firewall application.

In one example, the data processing system 100 is configured to act as a broker or risk-management agent that operates on a set of TCP streams established between clients and an electronic exchange. A broker or risk-management agent mediates the exchange of FIX messages between clients and an electronic exchange, and may modify the messages exchanged between the two. The engine of the NIC may decode each FIX message carried in a TCP data packet and pass the decoded messages to the appropriate entity at the host—typically a host application that is performing the broker or risk-management agent functions. TCP processing is performed at the host stack as described herein.

Once the host application has processed the decoded message and performed any necessary modifications, it causes the engine to encode the modified message and forward it over the appropriate TCP stream to the intended endpoint (e.g. the exchange or a client). TCP processing is performed at the host, and the engine is provided with sufficient information to form a TCP packet around the modified FIX message it generates. Typically, the host application would cause the engine to perform the FIX protocol processing by making a call to the host stack in respect of the appropriate TCP stream. The host stack would recognise that that TCP stream is being handled by the engine and the stack would therefore hand over FIX protocol processing to the engine.

It should be appreciate that FPGAs, GPUs and other devices may be used in some embodiments to perform processing functions traditionally performed by a host CPU. Sometimes the device is used to offload a subset of processing from a host device, and sometimes entire applications are moved to the device.

It is often desirable for the application on the device to handle communications encapsulated in the TCP protocol (or similar). This may be challenging, especially in FPGAs or hard logic because:

TCP is a complex protocol, requiring a great deal of logic resources to implement.

TCP requires large amounts of buffering per stream to handle receipt of out-of-order packets efficiently.

TCP may retain transmitted payload until it is acknowledged in case it needs to be retransmitted. This further increases per-stream buffering needed.

Some embodiments may provide an architecture that supports TCP in a device requiring far fewer resources than the prior art. Both logic and buffering requirements may be reduced, and very high performance may be possible.

Some embodiments may have a second processing entity to be available to assist in the TCP protocol handling. This may be software running on a host CPU in a server and the device may be a peripheral device connected to the server.

Some embodiments may use the OpenOnload stack provided by the applicant. Other TCP stacks may be adapted to perform the host role.

The host role could alternatively be performed by another device. The host role need not be within the same server as the device. For example, the device could be an FPGA in a switch, and the host role could be fulfilled by software on a server connected to the switch via a network.

Some embodiments may perform critical path processing on the device, while leaving most other functions to software on the host. In particular, the complexities of TCP protocol processing and the buffering may be handled in software.

This embodiment may treat the transmit path and receive path separately. In some embodiments, one may be handled entirely in software while the other is handled on the device. For example, received data may be consumed in software on the host while transmitted data could be generated and sent by the device. The opposite configuration is also possible in some embodiments. The advantage of this is that the device may handle fewer functions if desired, which may reduce development time and/or resource utilisation.

Some embodiments may be the opposite of a classic TCP Offload Engine (TOE). TOE is a device that performs TCP functions on behalf of a host. The application that terminates the TCP stream is on the host. The device performs TCP protocol processing and passes payload to and from the host.

In some embodiments, the application that terminates the TCP stream is on the device, and the host performs a subset of TCP functions. TCP protocol processing may be split between the host and the device.

The state may be stored on the device. For each stream managed by the device, at least the following state may be stored:
Local and remote IP addresses and TCP port numbers
If the implementation supports separate control over handling of receive and transmit paths:
Whether the receive path is managed by the device
Whether the transmit path is managed by the device
For streams whose receive path is managed:
rcv_nxt: The expected sequence number of the next payload byte.
For streams whose transmit path is managed:
MAC address of the remote IP
snd_nxt: The sequence of the next byte of payload to be sent.
snd_max: The maximum sequence number that may be transmitted.
Further optional per-stream state:
VLAN (optional)
Counters/statistics
For the device receive path, for each received TCP packet the device may extract the following fields from the packet headers:
Source and destination IP addresses and TCP port numbers
VLAN (optional)
These fields may be looked up in a table which contains an entry for each stream managed by the device. If the device is not configured to manage the receive path for the stream then the packet may be forwarded to the host.

The sequence number in the TCP header is compared with rcv_nxt. If they match, then the packet is in-order.

Here is an example of an algorithm executed on the device for the TCP receive path:
r1) If any of the following are true, forward the packet to the host:
SYN or RST flags are set.
Packet does not have any payload.
Sequence check fails (packet is out of order).
r2) The remaining packets have payload and are received in order.
Forward these packets to the delivery engine.
r3) The delivery engine:
Validates the IP and TCP checksums. If IP, TCP and (if applicable) layer-2 checksums are all correct:
Updates the next expected sequence value.
Forwards the TCP payload to the consumer together with an indication that identifies the associated stream.
Forwards a 'payload-received' message to the host.
Otherwise discards the packet or forwards it to the host.
A payload-received message may include the packet headers but preferably does not include the payload. It may be used by the host stack to update the TCP state machine.

The payload-received message may include the device's rcv_nxt value for the stream.

The receive path may accepts packets received from the network, but may also accept packets from the host. This may happen when the host is putting packets received out-of-order back into the correct order.

Optionally the delivery engine can forward the TCP payload before validation of the checksums is complete. Whether or not the checksums are correct is signalled at the end of the payload.

This may reduce latency and requires less buffering. However, in this configuration the consumer may be prepared to cancel the results of any processing performed in the event that the checksums are found to be incorrect.

Here is the algorithm executed on the device for the TCP transmit path:
t1) The application generates TCP payload and passes it, together with an indication of the associated stream, to the TCP transmit block.
t2) The TCP payload is buffered until the end of the message or until enough payload is available for a maximum sized TCP packet. A checksum is calculated over the TCP payload as it streams into the buffer.
t3) The TCP payload is streamed out to the MAC (or next block) with protocol headers prepended. The snd_nxt is written into the sequence number field of the TCP header. The TCP checksum is computed from the payload checksum and other fields in the protocol headers.
t4) A copy of the packet is forwarded to the host.

The copy forwarded to the host is saved by the host until it is acknowledged by the receiver, and is used for retransmissions if necessary.

Optionally the buffering stage [t2] may be omitted if the application is able to supply the payload checksum together with the start of the payload. This is possible when much (or all) of the payload is known at the time of sending.

For example: The TCP payload may consist of a message with a known format, and where many of the fields are known a priori. A partial checksum is computed over the known fields before the decision to transmit is made. At the time of sending the checksum is updated according to the remaining fields and forwarded together with the payload.

An advantage may be a reduction in latency because the store-and-forward stage is omitted. There is no need for a store-and-forward buffer, so resource utilisation is reduced.

The device may maintain a sequence number, snd_nxt, which indicates the sequence number of the next byte to be sent. It is increased each time new TCP packets are sent.

A TCP sender may only transmit TCP packets with payload when permitted by the peer's receive window and by the congestion control algorithm. The device stores a sequence number, snd_max, which indicates the maximum sequence number that the sender may transmit. It may be computed as:

$$snd\_max = snd\_nxt + \min(peer\_receive\_window, congestion\_window)$$

Preferably snd_max is computed at the host and sent to the device when its value changes. (The new value may not be forwarded every time it change).

If the application on the device sends TCP payload whose sequence numbers would extend beyond snd_max, then the TCP packet is forwarded to the host only, and not transmitted on the wire. The packet may be marked to indicate that it has not been transmitted on the wire, and the host is then responsible for transmitting the packet when the peer receive window and/or congestion window open sufficiently.

The device's TCP transmit block may optionally provide an interface that exposes information about transmit flow control. Eg. Any combination of peer_receive_window, congestion_window, (snd_max-snd_nxt) or a signal indicating whether the next message will be transmitted onto the wire immediately.

The host may be responsible for maintaining most of the TCP state associated with each stream, and executing much of the TCP protocol. It receives packets forwarded by the device transmit and/or receive paths. For the most part the host processes these packets in the way that a normal TCP stack would in some embodiments.

Copies of transmitted packets forwarded by the device transmit path are buffered in a retransmit queue until they are acknowledged by the peer.

Packets forwarded to the host from the device receive path are processed according to the TCP rules in the normal way.

Payload-received messages may be processed as if the payload were present but are then discarded.

Here are some examples of actions that may be taken:
Packets that acknowledge new data may cause packets stored in the retransmit queue to be freed.
Packets that acknowledge new data may cause the congestion window to be increased.
Duplicate acknowledgements (ACKs) may cause packets stored in the retransmit queue to be retransmitted according to a "fast retransmit" algorithm.
Packets with payload that failed the sequence check may be buffered if out-of-order and in-window) or discarded (if out-of-window).
Packets that update the peer's receive window cause that update to be reflected in the TCP state.
Packets with the RST flag set may cause the TCP connection to be aborted.
Packets may cause timers to be started, modified or stopped.

If a payload-received message is received when the host has out-of-order packets buffered, and at least some of the buffered payload matches rcv_nxt (i.e. is now in-order) the host may send the in-order segments back to the device.

The host may compute snd_max and forward the result to the device.

The host may maintain timers that are used to support: Delayed acknowledgements, retransmit timeout, zero-window probes, keep-alive probes.

The host may establish new connections.

The host causes ACKs to be sent to acknowledge packets received with payload. The host may send a ready formatted ACK packet (which the device forwards), or a special message that causes the device to generate an ACK packet.

If the device is managing the transmit path for the stream it writes snd_nxt into the sequence number field in the TCP header of ACK packets.

The message from the host to the device preferably includes snd_max.

Preferably a single message type is used to both update snd_max and optionally instruct the device to generate an ACK packet.

If the MAC address associated with the remote IP of a stream changes, the host may update the MAC stored at the device.

The cut-through receive path may be connected to the cut-through transmit path via application logic. This can be used to perform inspection or validation functions while adding minimal latency. In this case the checksum from the header of the received TCP packet is updated to subtract out the contribution from the header, leaving a checksum over just the payload. Note that it is not known at this point whether the checksum is correct. This payload checksum is forwarded with the start of the payload to the cut-through transmit path.

Application logic between the receive and transmit paths may manipulate the TCP payload, but if it does so then it updates the payload checksum to reflect the changes.

If validation of the checksum on the receive side fails, then the transmit path may be signalled to abort the transmit operation. At this point the packet may already be partially written onto the wire, in which case the packet is poisoned by writing a bad CRC onto the end.

Connection establishment may be performed in the host in the normal way. An established connection may then be migrated onto the device. The transmit path and the receive path can be migrated independently of one another.

Migration involves passing information about the TCP stream to the device, including at least:
Local and remote IP address and port numbers
VLAN (optional)
MAC address associated with remote IP
rcv_nxt
snd_nxt
snd_max It is possible for TCP segments to be reordered in the network, and when this happens the receive path can go via the host, which adds latency.

As an option, a re-order buffer on the device may be provide. This buffers small numbers of packets that arrive out-of-order temporarily, and puts them back into order if possible.

If the re-order buffer gets full, or packets in the re-order buffer are not able to be delivered in order, then the packets are forwarded to the host as described above.

This technique may deal with common cases of minor re-ordering without incurring extra latency.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:
1. A network interface device comprising:
an interface configured to receive data packets for a host processing device; and an engine supporting a network interface device component of an application, said application being provided on said host processing device, said engine configured in response to receiving of one or more data packets for said application:
  to cause at least some of said one or more data packets to be available to said network interface device component of said application, wherein said engine is configured to deliver said at least some of said one or more data packets to a memory location to which said component of said application has access and to provide an indication to said application component that said data is available for processing,
  to cause said at least some of said received one or more data packets to be delivered to a protocol stack of said host processing device,
  to receive, from said protocol stack of the host processing device, first control information associated said with said one or more data packets,
  to determine whether there is a discrepancy between second control information stored in memory and the first control information associated said with said one or more data packets received from the protocol stack, wherein if it is determined that there is a discrepancy, updating said second control information in the memory,
  wherein said interface is configured to output at least one acknowledgement message in dependence on at least one of said first and second control information, wherein said first and second control information comprises TCP window size information.

2. The network interface device as claimed in claim 1, wherein said network interface device component of said application is configured to indicate to said engine when said application component has processed said at least some of said one or more data packets.

3. The network interface device as claimed in claim 1, wherein said engine is configured in response to receiving of one or more data packets for the host processing device to generate a first acknowledgement message of said at least one acknowledgement message, said first acknowledgement message comprising an acknowledgment associated with said one or more data packets and said second control information.

4. The network interface device as claimed in claim 3, wherein said engine is configured to receive said first control information from said protocol stack in a host acknowledgement message and when said engine determines that a second acknowledgement message of said at least one acknowledgement message is required, said host acknowledgement message is output as said second acknowledgement message.

5. The network interface device as claimed in claim 4, wherein said engine is configured to, when the engine determines that there is a discrepancy between the second control information stored in memory and the first control information received from the protocol stack for said one or more data packets, determine if said second acknowledgement message is to be output.

6. The network interface device as claimed in claim 4, wherein said engine is configured to receive said first control information from said protocol stack in a protocol stack acknowledgement message which message is, in use, output by said interface as said second acknowledgement message comprising said first control information.

7. The network interface device as claimed in claim 5, wherein if it determined that there is no discrepancy between the first control information and the second control information then said second control information is not updated in the memory, and the second acknowledgement message is not output.

8. The network interface device as claimed in claim 5, wherein if it is determined that there is a discrepancy between the first control information and the second control information then said second control information is updated in the memory, and the second acknowledgement message is not output.

9. The network interface device as claimed in claim 5, wherein if it is determined that there is above a threshold amount of discrepancy between the first control information and the second control information then said second control information is updated in the memory and the second acknowledgement message is output by the interface.

10. The network interface device as claimed in claim 1, wherein said engine is configured to use said first control information received from said protocol stack in a subsequent acknowledgement message.

11. The network interface device as claimed in claim 1, wherein said engine is configured to receive said first control information from said protocol stack in a further acknowledgement message.

12. The network interface device as claimed in claim 1, wherein said engine is configured to provide to said host processing device information to indicate that payload of one or more of said data packets has been provided to said network interface device component of said application.

13. The network interface device as claimed in claim 12, wherein said information indicating that payload of one or more of said data packets has been provided to said network interface device component of said application is provided with the one or more data packets delivered to said protocol stack.

14. The network interface device as claimed in claim 12, wherein said information indicating that payload of one or more of said data packets has been provided to said network interface device component of said application is provided by setting a bit to a given value.

15. The network interface device as claimed in claim 1, wherein said engine comprises an FPGA.

16. The network interface device as claimed in claim 1, wherein said engine is configured such that at least some of said one or more packets is caused to be available to said network interface device component of said application in response to one or more conditions being satisfied.

17. The network interface device as claimed in claim 16, wherein said one or more conditions comprise one or more of a protocol state and a payload content of said one or more data packets.

18. The network interface device as claimed in claim 1, wherein said application comprises a financial trading application.

19. The network interface device as claimed in claim 1, wherein said application component is configured to receive information from an application programming interface (API) on the host processing device for said application, wherein said application on said host processing device is configured to control one or more of when and which data is processed by the application component.

20. A network interface device comprising:
  an interface configured to receive data packets for a host processing device; and
  an engine configured in response to receiving of one or more data packets for the host processing device, to generate a first acknowledgement message, said first acknowledgement message comprising an acknowledgment associated with said one or more data packets and control information determined by the host processing device and which is configured to be transmitted by the interface, to cause at least some of said one or more data packets to be available to said host processing device and to cause at least some of said one or more data packets to be available to a component of an application, wherein said engine is configured to deliver said at least some of said one or more data packets to a memory location to which said network interface device component of said application has access and to provide an indication to said application component that said data is available for processing, to receive from said host processing device first control information for providing in said acknowledgement message, and to determine whether there is a discrepancy between second control information stored in memory and the first control information received from the host processing device, wherein if a discrepancy is determined, providing a second acknowledgment message, comprising the first control information, to be transmitted by the interface and updating said second control information in the memory, wherein said first and second control information comprises TCP window size information.

21. A method performed in a network interface device comprising:

receiving one or more data packets for a host processing device;

causing at least some of said one or more data packets to be available to a component, on said network interface device, of an application, said application being provided on said host processing device;

delivering said at least some of said one or more data packets to a memory location to which said network interface device component of said application has access;

providing an indication to said network interface device component of said application that said data is available for processing;

causing said received one or more data packets to be delivered to a protocol stack of said host processing device;

receiving from said protocol stack of the host processing device first control information associated said with said one or more data packets;

determining whether there is a discrepancy between second control information stored in memory and the first control information received from the protocol stack associated with said one or more data packets, wherein if a discrepancy is determined, updating said second control Information in the memory; and outputting at least one acknowledgement message in dependence on at least one of the first and second control information, wherein said first and second control information comprises TCP window size information.

* * * * *